United States Patent
Liang

(10) Patent No.: US 9,109,451 B1
(45) Date of Patent: Aug. 18, 2015

(54) TURBINE BLADE WITH MICRO SIZED NEAR WALL COOLING CHANNELS

(71) Applicant: George Liang, Palm City, FL (US)

(72) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 457 days.

(21) Appl. No.: 13/681,848

(22) Filed: Nov. 20, 2012

(51) Int. Cl.
  *F01D 5/18* (2006.01)
  *F01D 5/12* (2006.01)
  *F01D 25/12* (2006.01)

(52) U.S. Cl.
  CPC ...... *F01D 5/12* (2013.01); *F01D 5/181* (2013.01); *F01D 5/187* (2013.01); *F01D 25/12* (2013.01); *F05D 2260/204* (2013.01)

(58) Field of Classification Search
  CPC ......... F01D 5/181; F01D 5/187; F01D 25/12; F05D 2260/204
  See application file for complete search history.

(56) References Cited

U.S. PATENT DOCUMENTS

| | | | | |
|---|---|---|---|---|
| 3,698,834 A | * | 10/1972 | Meginnis | 416/96 R |
| 5,702,232 A | | 12/1997 | Moore | |
| 7,198,458 B2 | * | 4/2007 | Thompson | 415/115 |
| 8,167,558 B2 | * | 5/2012 | Liang | 416/97 A |
| 8,414,263 B1 | * | 4/2013 | Liang | 416/96 R |

* cited by examiner

*Primary Examiner* — Igor Kershteyn
(74) *Attorney, Agent, or Firm* — John Ryznic

(57) ABSTRACT

A turbine blade with a plurality of rows of micro sized near wall cooling channels formed within an outer side of the airfoil wall to produce near wall cooling of the hot surface of the airfoil. The near wall cooling channels extend around the entire airfoil surface from the trailing edge to the leading edge regions and are formed using a metal printing process. Each row of near wall cooling channels discharges into a trench that opens onto the blade tip to provide a seal against hot gas leakage across the blade tips.

6 Claims, 4 Drawing Sheets

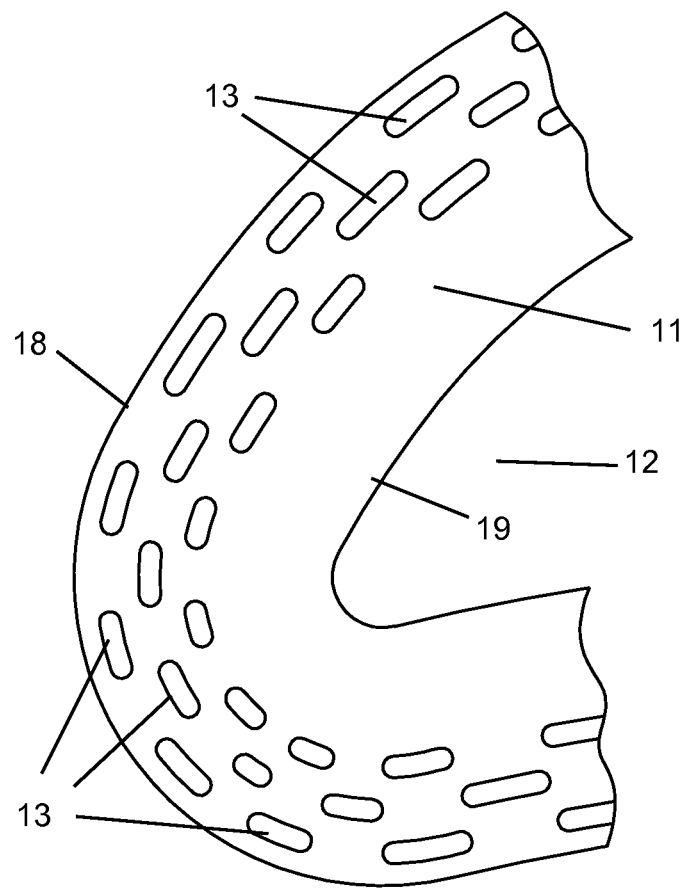
 
FIG 3          FIG 4

US 9,109,451 B1

TURBINE BLADE WITH MICRO SIZED NEAR WALL COOLING CHANNELS

CROSS-REFERENCE TO RELATED APPLICATIONS

None.

GOVERNMENT LICENSE RIGHTS

None.

BACKGROUND OF THE INVENTION

Field of the Invention

The present invention relates generally to a gas turbine engine, and more specifically to a turbine blade with near wall cooling.

DESCRIPTION OF THE RELATED ART INCLUDING INFORMATION DISCLOSED UNDER 37 CFR 1.97 AND 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes) must be cooled by passing cooling air through internal cooling passages and discharging the cooling air through film cooling holes to provide a blanket layer of cooling air to protect the hot metal surface from the hot gas stream.

U.S. Pat. No. 5,702,232 issued to Moore on Dec. 30, 1997 entitled COOLED AIRFOILS FOR A GAS TURBINE ENGINE discloses one prior art blade with a near wall cooling circuit in an airfoil mid-chord section constructed of radial flow channels with re-supply holes along with film cooling holes to provide cooling for the blade. In this design, spanwise and chordwise cooling flow control due to the airfoil external hot gas temperature and pressure variations is difficult to achieve. Also, single radial channel flow is not the best method of utilizing cooling air and results in a low convection cooling effectiveness. The dimension for the airfoil external wall has to fulfill the casting requirements. This increases the conduction path and reduces the thermal efficiency for the blade mid-chord section cooling.

BRIEF SUMMARY OF THE INVENTION

A turbine blade with an airfoil wall that forms an internal hollow cavity where the airfoil wall includes rows of micro sized near wall cooling channels on an outer section of the wall to produce near wall cooling of the hot surface of the airfoil wall. The near wall cooling channels extend around the entire airfoil from a trailing edge region to a leading edge region and along both the pressure and suction side walls. The near wall cooling channels are too small to be formed from a ceramic core in a casting process, but can be formed by a metal printing process in which the blade and the channels are printed from a metal material.

The micro sized channels have a length of around 0.03 inches and a width of around 0.01 to 0.03 inches with spacing between adjacent rows of around 0.01 inches to form a small yet compact arrangement of cooling channels to produce a large convection surface area for improved cooling effectiveness.

The near wall cooling channels can have a race track shape or a kidney shape and extends from a platform section to the blade tip to produce cooling for the entire airfoil surface.

BRIEF DESCRIPTION OF THE SEVERAL VIEWS OF THE DRAWINGS

FIG. 2 shows an enlarged view of a leading edge region of the FIG. 1 blade with the micro sized near wall cooling channels.

FIG. 3 shows a top view of a micro sized near wall cooling channel of the present invention with a race track shape.

FIG. 4 shows a top view of a micro sized near wall cooling channel of the present invention with a kidney shape.

DETAILED DESCRIPTION OF THE INVENTION

The present invention is turbine rotor blade with micro sized near wall cooling channels formed along a hot wall section of the blade in which the blade and the micro sized channels are formed by a metal printing process with a small size and shape that cannot be formed using a ceramic core in a casting process. The basic construction technique involves the use of thick backing structure wall to carry the blade load and the use of micro sized spanwise extending cooling air channels to achieve near wall cooling purpose. This cooling and manufacture construction technique will greatly reduce the airfoil metal temperature and thus reduce airfoil cooling flow requirement and improve turbine efficiency.

Figure 1:
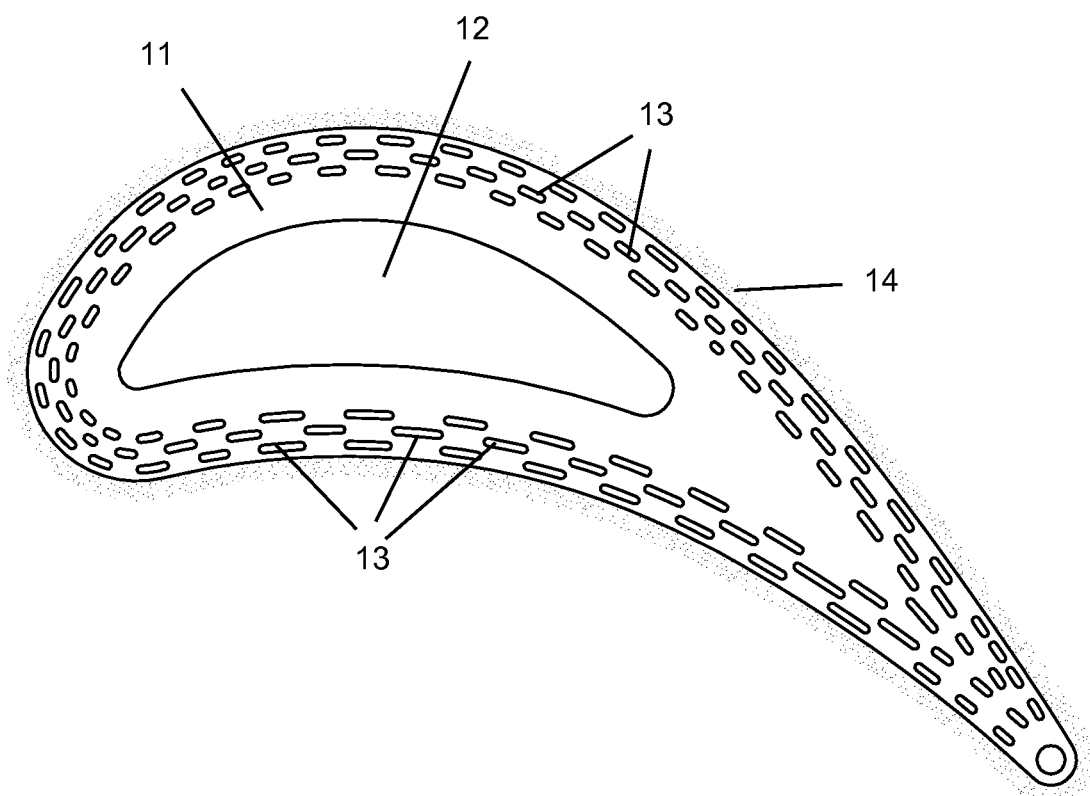
FIG. 1 shows a cross section top view of a turbine blade with micro sized near wall cooling channels of the present invention.

FIG. 1 shows the airfoil of the turbine blade with an airfoil wall 11 forming a hollow cavity 12 and three rows of micro sized near wall spanwise extending cooling channels 13 that extend around the entire airfoil from a trailing edge region along both the pressure side wall and the suction side wall and around a leading edge region to provide near wall cooling for the hot surface of the airfoil. A TBC or thermal barrier coating 14 is applied over the external surface of the airfoil 11. FIG. 2 shows an enlarged view of a section of the airfoil wall in which the rows of micro sized near wall cooling channels 13 are staggered and located on a half of the wall exposed to the hot gas stream. The inner half of the wall is without channels in order to form a strong support for the airfoil wall having the near wall cooling channels 13. Three rows of channels are used in this embodiment, but other embodiments can use a different amount.

The micro sized cooling channels 13 too small to be formed using a ceramic core in an investment casting process and thus are formed from a metal printing process such as that developed by Mikro Systems, Inc. or Charlottesville Va. in which the blade and the internal cooling air features are all printed together from a metal material. The channels 13 can be formed as a race track shape like in FIG. 3 or as a kidney shape as in FIG. 4. Each channel 13 has a length of around 0.03 inches and a width of around 0.01 inches with spacing between adjacent channels in a row of around 0.01 inches. The airfoil wall thickness between the external hot surface and the outer row of channels is around 0.008 inches to 0.015 inches to form a thin airfoil outer wall that cannot be formed from an investment casting process. The micro sized near wall cooling channels 13 are so small and so closely packed that a large convection cooling surface area is created that will produce a very high cooling effectiveness.

Figure 5:
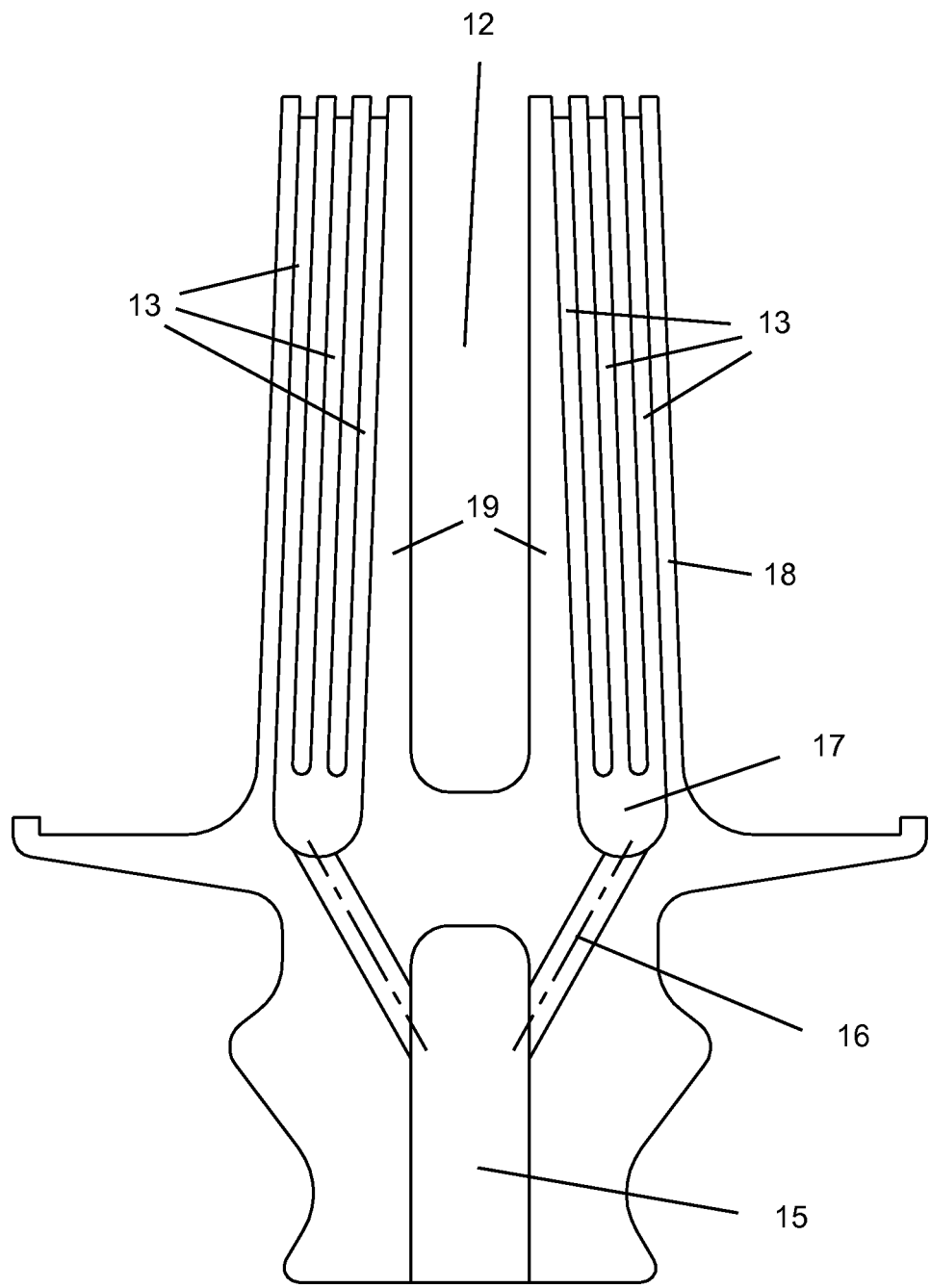
FIG. 5 shows a cross section side view of the turbine blade of the present invention with micro sized near wall cooling channels.

FIG. 5 shows a side view of the blade with the near wall cooling channels 13. The blade includes a root section with a cooling air supply cavity 15, and local cooling air feed holes 16 that connect the near wall cooling channels 13 to the cooling air supply cavity 15. The channels 13 are located between the outer surface 18 and the inner surface 18 of the airfoil wall 11.

Figure 6:
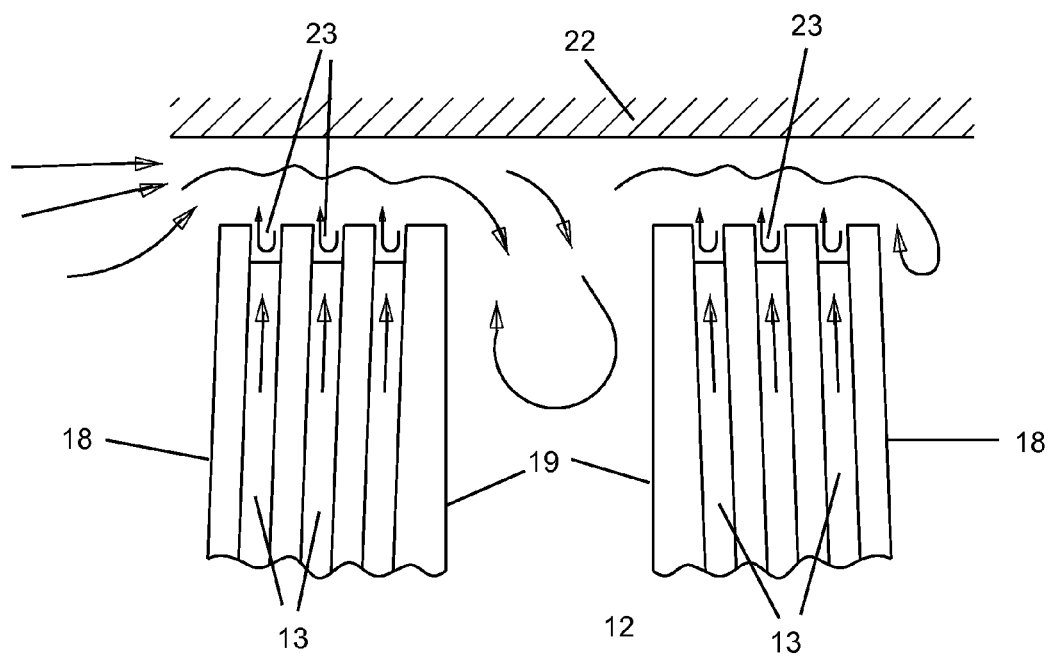
FIG. 6 shows an enlarged view of the blade tip section of the turbine blade of the present invention with micro sized near wall cooling channels.
Figure 7:
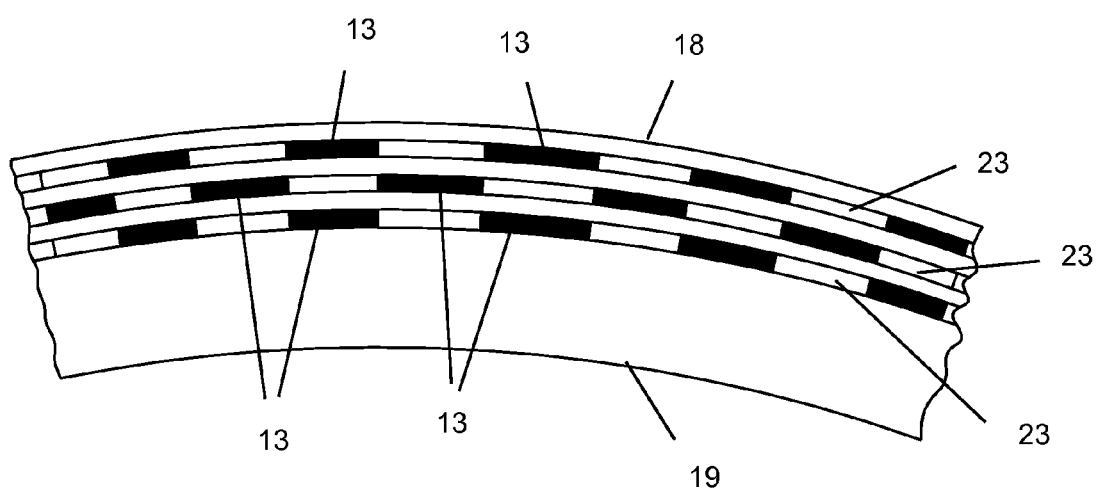
FIG. 7 shows a top view of a section of a blade tip wall of the turbine blade of the present invention with micro sized near wall cooling channels opening into trenches.

FIG. 6 shows a view of the blade tip section of the airfoil in which the rows of channels 13 open into separate trenches 23 that extend along each row of the channels 13. The numerous channels 13 discharge into a trench 23 that opens onto the blade tip crown and forms a seal against any leakage across the gap between a BOAS (Blade Outer Air Seal) 22 and the blade tip. FIG. 7 shows a top view of a section of the airfoil wall with three rows of trenches 23 in which each row of channels 13 discharges into.

The multiple near wall radial micro sized cooling flow channels are constructed in radial parallel formation. The individual radial micro cooling flow channels are sized based on airfoil gas side pressure distribution in both chordwise and spanwise directions. In addition, each individual radial micro cooling flow channel can be designed based on the airfoil local external heat load to achieve a desire local metal temperature. With this unique cooling construction approach, maximum usage of cooling air for a given airfoil inlet gas temperature and pressure profile is achieved. The use of multiple micro sized channels in the airfoil radial direction yields a higher internal convection cooling effectiveness than the single pass radial flow cooling technique used in the prior art airfoil near wall cooling design.

In operation, cooling air is supplied through the airfoil multiple radial cooling feed channels 16 at blade attachment region. Cooling air is then channel through each individual radial micro sized flow channels 13 around the airfoil peripheral from leading edge to trailing edge. The entire spent cooling air is discharged at blade tip peripheral to provide cooling for blade peripheral tip edge.

Since the cooling air is fed through the chordwise cooling supply cavities and then upward from blade root to tip, fresh cooling provides cooling for the blade root section first that will increase the blade HCF capability. The cooling air increases temperature in the radial channels 13 as it flows outward and thus induces hotter metal temperature at upper blade span. However the pull stress at the blade upper span is low and the allowable blade metal temperature is high. Thus it achieves a balanced thermal design by the use of this cooling approach.

In operation, due to the pressure gradient across the airfoil from the pressure side to the suction side, the secondary flow near the pressure side surface is migrated from lower blade span upward across the blade end tip. The near wall secondary flow will follow the contour of the pressure side surface on the airfoil peripheral and flows upward and forward against the oncoming streamwise leakage flow. The combined leakage flow from the stream wise direction and the radial upward direction is then channeled through the first pressure tip rail. As the leakage enters the pressure side tip corner, it bents outward and yields a smaller vena contractor thus reduces the effectiveness leakage flow area. The end results for this entrance effect reduce the blade leakage flow occur at the blade pressure side tip location. As the leakage flows through the first P/S squealer pocket, the leakage flow will be pinched again by the second P/S tip rail. The leakage flow is then pinched again by the third P/S tip rail. Subsequently, it will be pinched again by the 4th P/S tip rail from by the blade strong back wall.

This leakage flow is then discharged into the hollow cavity in between the airfoil pressure and suction walls to create a flow re-circulation with the leakage flow. This hot gas re-circulation flow will swing upward and follow the backside of the blade P/S end tip blocking the oncoming leakage flow. This action further reduces the leakage flow across the blade pressure wall.

Due to the pressure gradient across the blade tip, this leakage will leak through the blade suction side squealer pocket. Once again the same leakage resistance for the pressure side squealer pocket will be repeated for the suction side squealer pocket. On the blade suction wall end tip, as the leakage flows through the suction side squealer pocket, a recirculation flow is generated by the leakage on the upper span blade of the suction side wall. Once again, this hot gas recirculation flow will swing upward and follow the backside of the blade suction side end tip block the oncoming leakage flow thus reduces the total leakage flow.

As results of this construction, it creates a multiple leakage flow resistance phenomena by the blade end tip geometry than the traditional single squealer pocket. Plus an additional leakage flow resistant is formed by the deep squealer pocket in-between the pressure and suction side walls. This yields a very high resistance for the leakage flow path and thus reduces the blade leakage flow and heat load. Consequently, a more effective leakage flow reduction is achieved and it reduces the blade tip section cooling flow requirement.

Major design features and advantages of this cooling mechanism over the conventional serpentine cooled or super cooled blade design are enumerated below. The strong back blade inner wall is used to carry the blade loading and retain the structure integrity for airfoil. Elimination of casting with the use of ceramic core for the cooling feature. Simplified manufacture process and increase casting yields. The multiple micro cooling channels provides cooling throughout the entire airfoil surface, including the blade tip. The near wall cooling with thin external wall enhance blade cooling effectiveness by mean of reduce of conduction path and lower the thermal gradient across the airfoil wall. Double use of cooling is achieved. The cooling air is used to cool the airfoil wall first then discharge for tip section cooling. This double use of cooling air yields a very high over-all blade cooling effectiveness. The current cooling concept yields lower and more uniform blade sectional mass average temperature at lower blade span height which improves blade creep life capability. The current cooling concept is in line with the blade creep design requirement. The cooling air increases temperature in the multiple micro cooling channels as it flowing outward thus induces hotter sectional mass average temperature at upper blade span. However the pull stress at the blade upper span is low and the allowable blade metal temperature is high. Thus it achieves a balanced thermal design by the use of this cooling approach. Since the multiple micro cooling channels is also used in the airfoil leading and trailing edge region cooling. The cooling flow is initiated at the blade root section, this provides cooler blade leading and trailing edge corners thus enhances the blade HCF capability.

I claim the following:

1. A turbine rotor blade comprising:
an airfoil wall having an outer hot side and an inner cool side;
a first row of micro sized near wall cooling channels extending along the airfoil from a platform section to a blade tip section;
a second row of micro sized near wall cooling channels adjacent to and staggered from the first row of micro sized near wall cooling channels;
a third row of micro sized near wall cooling channels adjacent to and staggered from the second row of micro sized near wall cooling channels;
the first and second and third rows of micro sized near wall cooling channels extending from a trailing edge region along a pressure side wall and a suction side wall and around a leading edge region of the airfoil; and,
the first and second and third rows of micro sized near wall cooling channels are formed in an outer section of the airfoil wall with a solid section on an inner section of the airfoil wall that forms a support for the airfoil.

2. The turbine rotor blade of claim 1, and further comprising:
the micro sized near wall cooling channels each have a dimension of 0.03 inches in length and 0.01 to 0.03 inches in width.

3. The turbine rotor blade of claim 2, and further comprising:
the rows of near wall cooling channels are spaced from one another 0.01 inches.

4. The turbine rotor blade of claim 1, and further comprising:
an outer wall thickness of the airfoil from an external surface to a first row of near wall cooling channels is around 0.01 inches.

5. The turbine rotor blade of claim 1, and further comprising:
each of the rows of near wall cooling channels discharges into a separate trench that opens onto a blade tip of the blade.

6. The turbine rotor blade of claim 1, and further comprising:
the micro sized near wall cooling channels is too small to be formed from a ceramic core with an investment casting process.

* * * * *